Aug. 1, 1939.  R. G. HAWKSLEY  2,168,210
UTILITY TABLE FOR MOTOR VEHICLES
Filed July 29, 1937
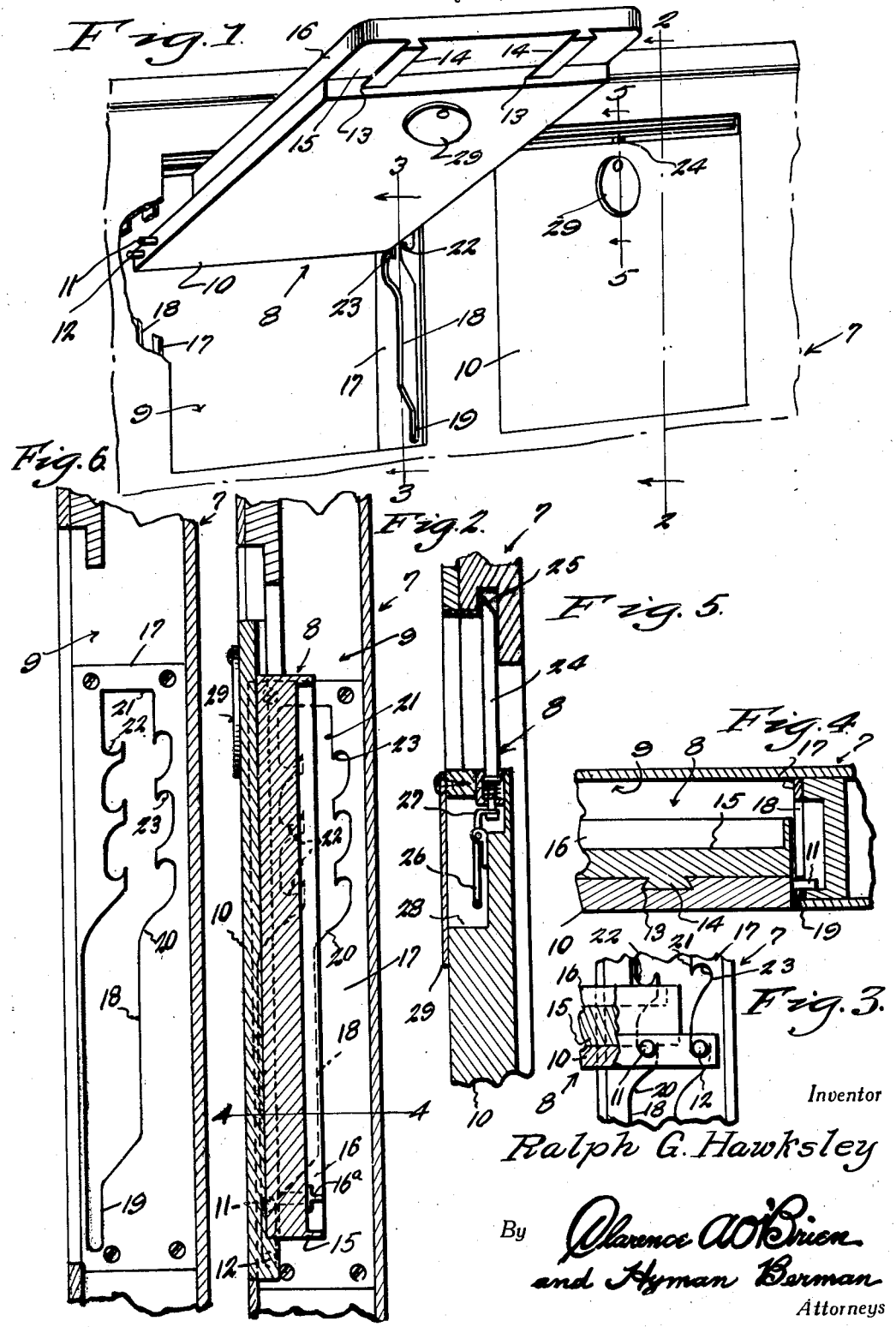
Inventor
Ralph G. Hawksley
By Clarence A. O'Brien
and Hyman Berman
Attorneys Patented Aug. 1, 1939

2,168,210

UNITED STATES PATENT OFFICE 2,168,210

UTILITY TABLE FOR MOTOR VEHICLES

Ralph Goodwin Hawksley, Cranston, R. I.

Application July 29, 1937, Serial No. 156,392

2 Claims. (Cl. 311—20)

This invention relates to a novel and structurally improved utility table construction of a built-in type usable in motor vehicles, particularly so-called pleasure cars and the like, and has more specific reference to a structure of this type embodying one or more foldable tables mounted in receiving compartments in the conventional back forming a part rest of the front seat of the car.

Manifestly, the purpose of the invention is to provide two or more extensible tray-like tables for use by the occupants of the rear seat, said tables being constructed with requisite nicety and adequately and ingeniously mounted in special accommodation compartments formed therefor in the back of the front seat, whereby to permit the tables, of a projectible and retractible type, to be readily projected and extended for use, or folded compactly to a convenient out-of-the-way position when not in use.

My primary aim is to accomplish the desired results through the adoption and use of a reliable and practical structural assemblage, and it will thus be seen that the novelty is predicated upon an adjustably mounted carrier leaf for the tray, said carrier leaf having unique structural association with adapter and retention fixtures provided therefor in the compartment in which the table is stored when not in use.

Features and advantages in addition to those above mentioned will become more readily apparent from the following description and accompanying illustrative drawing.

In the drawing, wherein like numerals are employed to designate like parts throughout the same:

Figure 1 is a fragmentary perspective view showing a rear face view of the back of what may be called the front seat in an automobile, this being constructed in accordance with the principles of the present invention and showing the retractable and extensible utility tables, one being in closed position and the other one projected at right angles to the seat in readiness for use.

Fig. 2 is an enlarged fragmentary vertical sectional view, the same being taken approximately on the plane of the line 2—2 of Figure 1 looking in the direction of the arrows.

Figure 3 is a fragmentary view partly in elevation and partly in section, the view being taken substantially on the plane of the line 3—3 of Figure 1.

Figure 4 is a fragmentary sectional view taken approximately on the plane of the line 4—4 of Figure 2.

Figure 5 is an enlarged fragmentary detailing view showing the retaining or latch means, this being on the line 5—5 of Figure 1.

Figure 6 is a view like Figure 2 with the entire utility shelf removed to expose and disclose the specific construction of one of the bracket forming or adapter plates.

In practice it has been found expedient and practicable to provide at least two foldable tables. It is evident, however, that each table construction is the same, and therefore, a description of one will suffice for both.

In the drawing the back of the front seat of the automobile is denoted by the numeral 7 and it is in this part that the extensible and retractible tables are mounted. The table, as a unit, is denoted by the numeral 8, and this is foldable into an accommodation compartment 9 formed in the seat structure 7. As shown to advantage in Figure 1, it comprises a leaf 10 of general rectangular form, the same being provided at its attached supportable end with pairs of outstanding lugs 11 and 12. In its top said leaf is provided with spaced parallel grooves 13 of dovetailed cross-section to accommodate keys or ribs 14 of corresponding cross-sectional form provided on the table proper. The latter part is distinguished by the numeral 15 and is of appropriate dimensions and form and preferably provided with surrounding marginal rim 16 so that it is in effect a feeding tray. Any appropriate retention or fastening means such as a clamping or set-screw 16a may be provided to hold the tray in its extended position. Hence, when the shelf or leaf 10 is in useful position, it is possible to adjust the tray 15 toward and from the occupants of the rear seat making it convenient for use.

Calling attention now to Figure 5, it will be observed that the numerals 17 designate special adapter plates or fixtures. These plates are disposed in spaced parallelism and suitably mounted in the vertical end walls of the compartments 9. The plates are provided with accommodation slots 18 whose lower ends 19 function as keeper notches for the lugs or pins 11 and 12 when the structure is retracted and folded into the compartment. The intermediate portion of the pin-accommodation slot is laterally offset as at 20 and then vertically extended as at 21. The edges of the portion 21 are notched to provide selectively usable abutments or keepers 22 and 23 for the pins 11 and 12. That is to say, the opposed seats 22 accommodate the outer pins 11, while the seats 23 accommodate the inner pins 12 (see Figure 3). Due to the reverse action of the pins engaging in these selectively usable seats it is possible to adjust the shelf 10 at right angles to the brackets or plates 17 and to position the shelf at the desired elevation.

For convenience the members 22 and 23 may be conveniently called keeper notches or seats. The pins 11 and 12 may be alternatively called companion detents selectively engageable with predetermined keeper notches. The shelf and tray, as a unit, including the pins, can be adjusted in relation to the adapter plates 17, as is obvious. Thus, the shelf 8 is adjustable as to height and also adjustable as to length.

Suitable means will of course be provided to maintain the adjustable extensible table means in closed, nonrattling position within the accommodation compartment or pocket 9. A suggested means is shown in Figure 5. Here it will be observed that a spring pressed latch is provided at 24, the same being engageable in a keeper recess 25. The numeral 26 designates a suitable actuating ring having operating connection as at 27 with the latch to release it. The ring is confined in a pocket 28 over which is a pivoted cover plate or disk 29. By simply swinging the disk to one side the ring 26 is rendered available, whereby to release the latch and render the structure free to be lifted bodily between the brackets 17 to position for use.

Other finishing accessories, such as may be commercially required, may be incorporated in the final construction. The gist of the invention, however, resides in these different phases: First, novelty is apparently predicated on a retractible and extensible adjustable table with accommodation compartment means therefor and means in the compartment for holding the table in useful position. The table itself is made up of the companion shelf 10 and slidable tray 15. The double notched slot and pin arrangement whereby to provide the proper maintenance and adjustment for the sectional table is a well directed improvement.

It is thought that the description taken in connection with the drawing will permit a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a construction of the class described, a relatively fixed support having a recess therein providing a compartment, a pair of fixedly mounted adapter plates confined in the compartment, vertically disposed, and located in spaced parallelism with respect to each other, said plates being provided in opposed portions with vertically elongated slots, the opposite edges of said slots being provided with opposed pairs of selectively usable keeper notches, and a shelf foldable into and constituting a closure for the open front of said compartment, the inner end of said shelf being provided with outstanding pairs of retaining pins, and said pins being located for movement in said slots and adapted for engagement with predetermined ones of said keeper notches.

2. In a construction of the class described, a relatively stationary vertically disposed support having a recess therein forming a disappearing shelf accommodation compartment, a pair of duplicate adapter plates attached to vertical side-walls in said compartment, said plates being disposed in opposed parallelism, each plate being provided with an elongated slot having its lower end restricted and its upper end portion widened and laterally off-set, the opposite longitudinal edges of said off-set portion being provided with opposed keeper notches, and a shelf having its inner end portion disposed for vertical sliding and hinging movements between said adapter plates, said shelf constituting a closure for the open side of said compartment and that portion thereof between said keeper plates being provided with opposed sets of outstanding retaining pins, said pins being operable in the respective slots and selectively engageable with predetermined sets of keeper notches.

RALPH GOODWIN HAWKSLEY.